United States Patent
Naturel et al.

(10) Patent No.: US 12,462,602 B2
(45) Date of Patent: Nov. 4, 2025

(54) LEARNING METHOD FOR A MACHINE LEARNING SYSTEM FOR DETECTING AND MODELING AN OBJECT IN AN IMAGE, CORRESPONDING COMPUTER PROGRAM PRODUCT AND DEVICE

(71) Applicant: FITTINGBOX, Labege (FR)

(72) Inventors: Xavier Naturel, Auzeville-Tolosane (FR); Ariel Choukroun, Saint Orens de Gameville (FR)

(73) Assignee: FITTINGBOX, Labege (FR)

( * ) Notice: Subject to any disclaimer, the term of this patent is extended or adjusted under 35 U.S.C. 154(b) by 353 days.

(21) Appl. No.: 18/264,970

(22) PCT Filed: Feb. 10, 2022

(86) PCT No.: PCT/FR2022/050240
§ 371 (c)(1),
(2) Date: Aug. 10, 2023

(87) PCT Pub. No.: WO2022/171960
PCT Pub. Date: Aug. 18, 2022

(65) Prior Publication Data
US 2024/0054810 A1     Feb. 15, 2024

(30) Foreign Application Priority Data
Feb. 11, 2021     (FR) ..................... 2101319

(51) Int. Cl.
*G06V 40/16*     (2022.01)
*G06V 10/44*     (2022.01)

(52) U.S. Cl.
CPC ............ *G06V 40/168* (2022.01); *G06V 10/44* (2022.01)

(58) Field of Classification Search
CPC ..... G06V 40/168; G06V 10/44; G06V 40/171
See application file for complete search history.

(56) References Cited

U.S. PATENT DOCUMENTS

| 2015/0055085 A1* | 2/2015 | Fonte ....................... G16B 5/00 700/98 |
| 2018/0005448 A1 | 1/2018 | Choukroun et al. |
| 2021/0088811 A1* | 3/2021 | Varady ................ G06V 40/171 |

OTHER PUBLICATIONS

Wang, Yatiing et al., "Eyeglasses 3D Shape Reconstruction from a Single Face Image", Advances in Intelligent Data Analysis XIX, [Lecture Notes in Computer Science, Lect.Notes Computer], pp. 372-387, Nov. 20, 2020 (Nov. 20, 2020), ISSN: 0302-9743,ISBN: 978-3-540-35470-3. XP047593582.

(Continued)

*Primary Examiner* — Phuoc Tran
(74) *Attorney, Agent, or Firm* — Perman & Green, LLP

(57) ABSTRACT

A learning method of a machine learning system carries out the steps of: obtaining augmented reality images including a real image and at least one virtual element representative of the object and/or the characteristic region; obtaining, for each augmented reality image, learning information including, for at least one given virtual element of the augmented reality image: a model for segmenting the given virtual element, and a set of contour points corresponding to a parameterisation of the given virtual element; and learning on the basis of the plurality of augmented reality images and the learning information, delivering a set of parameters enabling the machine learning system to detect and model the object and/or the characteristic region in a given image.

11 Claims, 3 Drawing Sheets

(56) References Cited

OTHER PUBLICATIONS

Xiaoyun, Yuan et al., "Magic Glasses: From 2D to 3D", IEEE Transactions on Circuits and Systems for Video Technology, Institute of Electrical and Electronics Engineers, US, vol. 27, No. 4, Apr. 1, 2017 (Apr. 1, 2017), pp. 843-854, DOI: 10.1109/TCSVT.2016. 2556439, ISSN: 1051-8215, XP011644787.
International Search Report for application No. PCT/FR2022/050240 dated May 24, 2022.

* cited by examiner

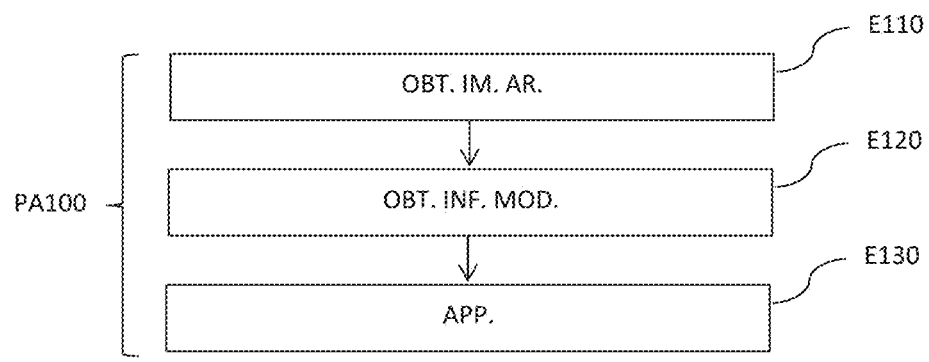
[Fig.1]
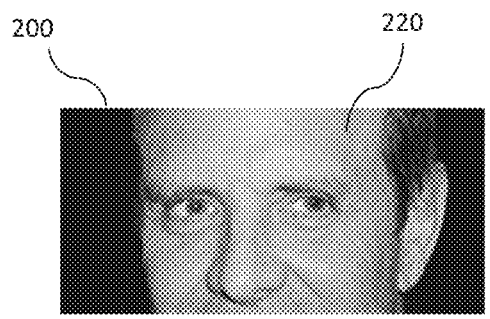
[Fig.2a]
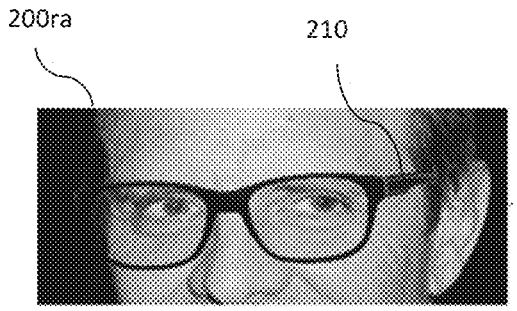
[Fig.2b]
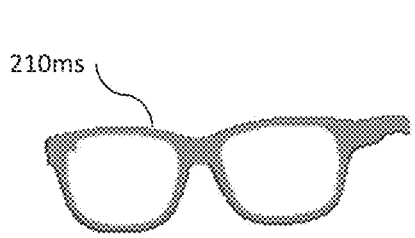
[Fig.2c]
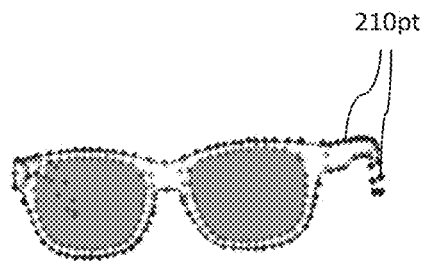
[Fig.2d]

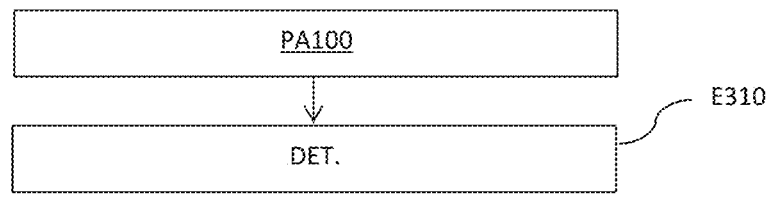
[Fig.3]
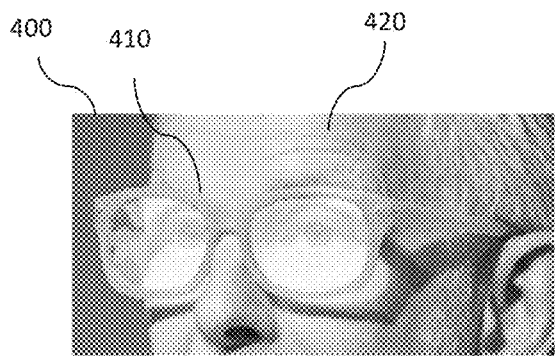
[Fig.4a]
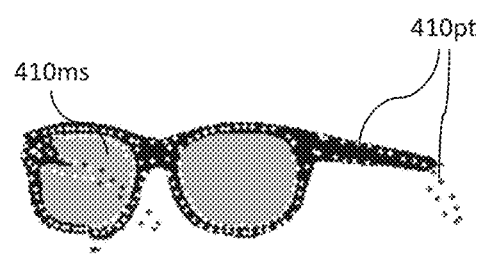
[Fig.4b]
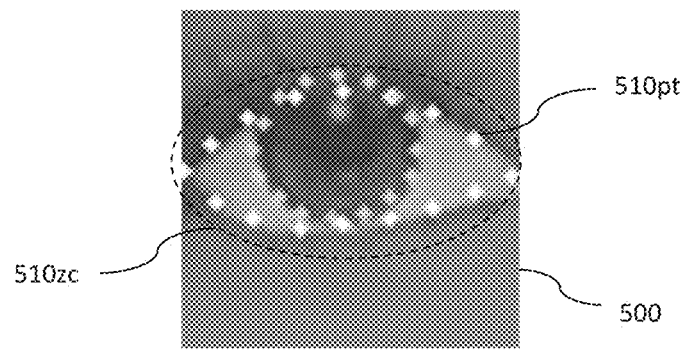
[Fig.5]

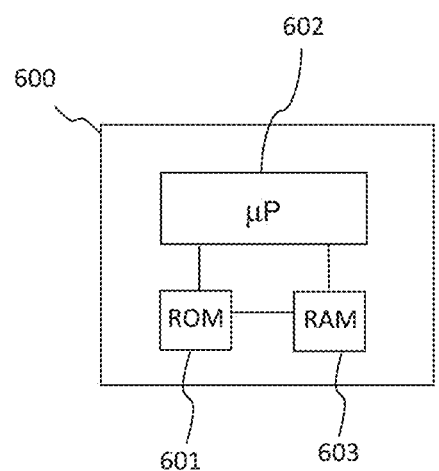
[Fig.6]

LEARNING METHOD FOR A MACHINE LEARNING SYSTEM FOR DETECTING AND MODELING AN OBJECT IN AN IMAGE, CORRESPONDING COMPUTER PROGRAM PRODUCT AND DEVICE

CROSS REFERENCE TO RELATED APPLICATIONS

This application is a National Stage of International Application No. PCT/FR2022/050240, having an International Filing Date of 10 Feb. 2022, which designated the United States of America, and which International Application was published under PCT Article 21(2) as WO Publication No. 2022/171960 A1, which claims priority from and the benefit of French Patent Application No. 2101319 filed on 11 Feb. 2021, the disclosures of which are incorporated herein by reference in their entireties.

BACKGROUND

Field

The field of the disclosure is that of image processing.

More particularly, the disclosure relates to a method for detecting and modeling an object and/or a characteristic region (for example eyes, a nose, etc.) detected in an image.

The disclosure has numerous applications, in particular, but not exclusively, for the virtual testing of a pair of spectacles.

Brief Description of Related Developments

In the remainder of this document, an existing problem is described in particular in the field of the virtual testing of a pair of spectacles with which the Inventors of the present patent application have been confronted. Of course, the disclosure is not limited to this particular field of application, but is of interest for the detection and modeling of any type of object represented in an image and/or any type of characteristic region (i.e. a portion of interest of the image) of such an image.

It is known from the prior art to use characteristic points of some objects and/or of some characteristic regions in order to detect the considered objects and/or characteristic regions. For example, the corner of the eyes is conventionally used as a characteristic point allowing detecting the eyes of an individual in an image. Other characteristic points may also be considered for the detection of a face, such as the nose or the corner of the mouth. In general, the quality of the detection of the face depends on the number and position of the used characteristic points. Such techniques are described in particular in the French patent published under the number FR 2955409 and in the international patent application published under the number WO 2016/135078, of the company filing the present patent application.

As regards a manufactured object, edges or corners may for example be considered as characteristic points.

However, the use of such characteristic points could lead to a lack of accuracy in the detection, and therefore in the modeling of the considered objects and/or characteristic regions where appropriate.

Alternatively, a manual annotation of the images is sometimes considered in order to artificially generate the characteristic points of the considered objects and/or characteristic regions. However, herein again, a lack of accuracy is noticed in the detection of the considered objects and/or characteristic regions. Where appropriate, such inaccuracy could lead to problems in modeling the objects and/or characteristic regions thus detected.

Thus, there is a need for a technique allowing accurately detecting and modeling one (or more) object(s) shown in an image and/or one (or more) characteristic region present in the considered image.

SUMMARY

In an aspect of the disclosure, a method is provided for learning a machine learning system for detecting and modeling at least one object represented in at least one given image and/or at least one characteristic region of said at least one given image. According to such a method, the machine learning system performs:

generating a plurality of augmented reality images comprising a real image and at least one virtual element representative of said at least one object and/or of said at least one characteristic region;

obtaining, for each augmented reality image, learning information comprising, for at least one given virtual element of the augmented reality image:
  a segmentation model of the given virtual element obtained from said given virtual element, and
  either a set of contour points corresponding to a parametrization of the given virtual element, or said parametrization, obtained from said given virtual element; and learning from the plurality of augmented reality images and the learning information, delivering a set of parameters enabling said machine learning system to detect said at least one object and/or said at least one characteristic region in said at least one given image and to determine corresponding modeling information comprising:
  a segmentation model of said at least one object and/or of said at least one characteristic region, and
  either a set of contour points corresponding to a parametrization of said at least one object and/or of said at least one characteristic region, or said parametrization.

Thus, the disclosure provides a new and inventive solution for learning a machine learning system (for example a convolutional neural network) so as to enable it to detect one (or more) object(s) (for example a pair of spectacles) and/or one (or more) characteristic region(s) (for example the contour of the eyes or the contour of the iris of the eyes) in a given image (for example an image showing the face of a person wearing spectacles) and determining corresponding modeling information.

More particularly, learning is done from augmented reality images comprising virtual elements representative of the object (or objects) and/or of the characteristic region (or characteristic regions). Thus, the segmentation (for example through a binary mask of the object and/or of the characteristic region simulated by the virtual element(s)) and the distribution of the points over the contour are accurately carried out. For example, this allows solving the ambiguity inherent to the manual annotation of such points. For example, the distribution of the points corresponds to a 2D or 3D parametrization of the object (for example a 3DMM model, or "3D Morphable Model") and/or of the characteristic region simulated by the virtual element(s). In this manner, the annotation is accurate and it is easy to go back to the parametrization from the contour points.

Moreover, the use of such virtual elements allows solving the problems of concealments, and therefore avoiding obtaining an incomplete annotation, as might be the case with the end of the spectacle temples concealed by the ears, or with the iris which is concealed by the eyelid. The mixture between real data (images) and virtual objects allows specializing the machine learning system to real cases of application. Thus, augmented reality images offer the best trade-off between the realism of the image and the ease of producing images and annotations with enough variability.

In aspects, for each augmented reality image, learning of the machine learning system comprises a joint learning from the segmentation model of the given virtual element and the set of contour points corresponding to a parametrization of the given virtual element.

Thus, a synergistic effect is obtained for learning of the machine learning system, learning of the segmentation model and learning of the set of contour points reinforcing each other. The segmentation model allows improving accuracy by maximizing the number of properly detected pixels of the virtual object (i.e. by minimizing the number of pixels wrongly detected as belonging to the object). Moreover, the set of points thus detected corresponds to a consistent shape of the object. In the present case, this consistency is reinforced by the fact that the points originate from a parametric model. Thus, a consistent shape of the object is obtained regardless of the position of the camera having captured the real image and regardless of the setup of the object in the augmented reality image.

In aspects, the joint learning implements a cost function dependent on a linear combination between a cross-entropy associated with the segmentation model of the given virtual element and a Euclidean distance associated with the set of contour points corresponding to a parametrization of the given virtual element.

For example, the machine learning system comprises a branch for learning the segmentation model and a branch for learning the set of contour points. Thus, the cross-entropy is associated with the branch for learning the segmentation model and a Euclidean distance is associated with the branch for learning the set of contour points.

In some aspects, the real image includes the illustration of a face. The learning information comprises, for at least one contour point of the set of contour points corresponding to a parametrization of the given virtual element, visibility information indicating whether the contour point is visible or whether it is concealed by the face.

Thus, the visibility of the contour points is taken into account.

In some aspects, the cost function further depends on a binary cross-entropy associated with the visibility of the contour point.

In some aspects, the learning information comprises the parameterization of said given virtual element.

Thus, the machine learning system is enabled to directly deliver the considered parametrization.

The disclosure also relates to a method for detecting and modeling at least one object represented in at least one image and/or at least one characteristic region of said at least one image. Such a detection and modeling method is implemented by a machine learning system trained by implementing the above-described learning method (according to any one of the aforementioned aspects). According to such a detection and modeling method, the machine learning system performs a detection of said at least one object and/or of said at least one characteristic region in said at least one image and performs a determination of modeling information of said at least one object and/or of said at least one characteristic region.

Thus, the learning having been done from augmented reality images comprising virtual elements representative of the object (or objects) and/or of the characteristic region (or characteristic regions), the consistency of the modeling information with the modeling of the object (or objects) and/or the characteristic region (or characteristic regions) is guaranteed. Moreover, in the case where both one (or more) object(s) and one (or more) characteristic region(s) (for example the eyes, the iris, the nose) are simultaneously detected and modeled, a synergistic effect is obtained improving the performances obtained for the object and the characteristic region compared to detection and modeling of only one of these two elements.

In some of the aforementioned aspects, the learning of the machine learning system comprises joint learning from, on the one hand, the segmentation model of the given virtual element and, on the other hand, from the set of contour points corresponding to a parametrization of the given virtual element. In some of these aspects, the determination implemented in the detection and modeling method comprises a joint determination:
 of the segmentation model of said at least one object and/or of said at least one characteristic region; and
 of the set of contour points corresponding to the parametrization of said at least one object and/or of said at least one characteristic region.

In the aforementioned aspects, the joint learning of the machine learning system implements a cost function dependent on a linear combination between, on the one hand, a cross-entropy associated with the segmentation model of the given virtual element and, on the other hand, a Euclidean distance associated with the set of contour points corresponding to a parametrization of the given virtual element. In some of these aspects, the joint determination implemented in the detection and modeling method implements a given cost function dependent on a linear combination between, on the one hand, a cross-entropy associated with the segmentation model of said at least an object and/or of said at least one characteristic region and, on the other hand, a Euclidean distance associated with the set of contour points corresponding to the parametrization of said at least one object and/or of said at least one characteristic region.

In aforementioned aspects, the learning of the machine learning system implements augmented reality images comprising real images comprising the illustration of a face. In some of these aspects, said at least one image comprises the representation of a given face and the machine learning system further determines, for at least one given contour point of the set of contour points corresponding to the parameterization of said at least one object and/or of said at least one characteristic region, visibility information indicating whether the given contour point is visible or whether it is concealed by the given face.

Thus, the machine learning system furthermore determines the visibility of the contour points.

In aforementioned aspects, the cost function implemented during the joint learning of the machine learning system further depends on a binary cross-entropy associated with the visibility of the contour point. In some of these aspects, the determination implemented in the detection and modeling method implements the given cost function. Such a given cost function further depend on a binary cross-entropy associated with the visibility of said given contour point.

In some of the aforementioned aspects, the learning information comprises the parameterization of the given virtual element. In some of these aspects, the modeling information comprises the parametrization of said at least one object and/or of said at least one characteristic region.

In some aspects, said at least one image comprises a plurality of images each representing a different view of said at least one object and/or of said at least one characteristic region. The detection as well as the determination are implemented jointly for each of said plurality of images.

Thus, the performances of detection and determination of the modeling information of the object (or objects) and/or of the characteristic region (or characteristic regions) are improved.

The disclosure also relates to a computer program comprising program code instructions for the implementation of a method such as described hereinabove, according to any of its different aspects, when it is executed on a computer.

The disclosure also relates to a device for detecting and modeling at least one object shown in at least one image and/or at least one characteristic region of said at least one image. Such a device comprises at least one processor and/or at least one dedicated computing machine configured to implement the steps of the learning method according to the disclosure (according to any one of the different aforementioned aspects). Thus, the features and advantages of this device are the same as those of the corresponding steps of the previously-described learning method. Consequently, they are not described in any further detail.

In some aspects, said at least one processor and/or said at least one dedicated computing machine is further configured to implement the steps of the detection and modeling method according to the disclosure (according to any one of the different aforementioned aspects). Thus, the features and advantages of this device are the same as those of the corresponding steps of the previously-described detection and modeling method. Consequently, they are not described in any further detail.

In some aspects, the above-described device comprises the aforementioned machine learning system.

In some aspects, the above-described device is the aforementioned machine learning system.

BRIEF DESCRIPTION OF THE FIGURES

Other aims, features and advantages of the disclosure will appear more clearly upon reading the following description, given as a mere illustrative and non-limiting example, with reference to the figures, wherein:

FIG. 1 shows the steps of a learning method of a machine learning system for the detection and modeling of one (or more) object(s) shown in at least one image and/or one (or more) characteristic region(s) of said considered at least one image according to an aspect of the disclosure;

FIG. 2a illustrates a real image comprising the illustration of a face;

FIG. 2b illustrates an augmented reality image comprising the real image of [FIG. 2a] and a pair of spectacles;

FIG. 2c illustrates a segmentation model of the pair of spectacles of the augmented reality image of [FIG. 2b];

FIG. 2d illustrates a set of contour points corresponding to a parametrization of the pair of spectacles of the augmented reality image of [FIG. 2b];

FIG. 3 shows the steps of a method for detecting and modeling one (or more) object(s) shown in at least one image and/or one (or more) characteristic region(s) of said considered at least one image according to an aspect of the disclosure;

FIG. 4a illustrates an image comprising the illustration of a face and a pair of spectacles;

FIG. 4b illustrates a segmentation model of the pair of spectacles of the image of [FIG. 4a] as well as a set of contour points corresponding to a parametrization of the pair of spectacles of the image of [FIG. 4a];

FIG. 5 illustrates a set of contour points corresponding to a parametrization of an eye in an image as well as the iris of the considered eye;

FIG. 6 shows an example of a structure of a device enabling the implementation of some steps of the learning method of [FIG. 1] and/or of the detection and modeling method of [FIG. 3] according to an aspect of the disclosure.

DETAILED DESCRIPTION

The general principle of the disclosure is based on the use of augmented reality images to perform training of a machine learning system (for example a convolutional neural network) so as to enable it to detect one (or more) object(s) (for example a pair of spectacles) and/or one (or more) characteristic region(s) (for example the contour of the eyes or the contour of the iris of the eyes, the nose) in a given image (for example an image illustrating the face of a person wearing spectacles) and determining corresponding modeling information.

More particularly, such an augmented reality image comprises a real image and at least one virtual element representing the considered object (or objects) and/or characteristic region (or characteristic regions).

Indeed, learning a convolutional neural network requires large amounts of annotated data. The cost of acquiring and annotating these data is very high. Moreover, the annotation accuracy is not guaranteed, which limits the robustness and the accuracy of the inference models thus created. The use of images of synthetic objects from parameterized 2D or 3D models allows having large volumes of learning data as well as guaranteeing the positioning and the visibility of 2D or 3D annotation points. These virtual objects are illuminated by a realistic environment map ("environment mapping"), which may be set or else estimated from the real image. Moreover, the use of such virtual elements allows solving the problems of concealments, and therefore avoiding obtaining an incomplete or inconsistent annotation because it is selected arbitrarily by the annotation operator.

Moreover, it is suggested to use, complementarily with the augmented reality images, learning information comprising a segmentation model associated with the corresponding virtual elements as well as a set of contour points corresponding to a parametrization of the considered virtual elements.

Thus, the segmentation (for example a binary mask of the object and/or of the characteristic region simulated by the virtual element(s)) and the distribution of the points on the contour are accurately carried out, without the need for annotation of the real image.

In the remainder of the present application, by "machine learning system", it should be understood a system configured both to perform the training of a learning model and to use the considered model.

Referring to [FIG. 1], the steps of a method PA100 for learning a machine learning system (for example a convolutional neural network) for the detection and modeling of one (or more) object(s) represented in at least one image and/or one (or more) characteristic region(s) of said considered at least one image according to an aspect of the disclosure. An example of implementation of the steps of the considered method PA100 is also discussed with reference to [FIG. 2A], [FIG. 2b], [FIG. 2c] and [FIG. 2d]. More particularly, according to the example of [FIG. 2a], [FIG. 2b], [FIG. 2c] and [FIG. 2d], the real image 200 comprises the illustration of a face 220 and the virtual element 210 is a pair of spectacles. Correspondingly, [FIG. 2c] illustrates a segmentation model 210ms of the virtual pair of spectacles of [FIG. 2b] and [FIG. 2d] illustrates a set of contour points 210pt corresponding to a parameterization of the virtual pair of spectacles of [FIG. 2b]. For more clarity, references to the elements of [FIG. 2a], [FIG. 2b], [FIG. 2c] and [FIG. 2d], will be used in the following to illustrate in a non-limiting manner the characteristics of the method PA100.

Returning back to [FIG. 1], during a step E110, the machine learning system obtains a plurality of augmented reality images 200ra comprising a real image 200 and at least one virtual element 210 representative of the object (or objects) and/or of the characteristic region (or characteristic regions).

For example, each augmented reality image 200ra is generated thanks to a tool dedicated to the insertion of virtual elements 210 into a real image 200. In some variants, the generation of the augmented reality images 200ra comprises an increase (via the addition, for example, of a Gaussian noise, of a blur) of at least one virtual element 210 before insertion into the real image 200. Such an increase comprises for example an illumination of the virtual object using a realistic environment map which may be set or else estimated from the real image. Thus, the realism of the virtual element 210 and/or its integration into the real image 200 is improved. For example, such an improved realism allows facilitating learning as well as improving the detection performances on real images.

For example, the augmented reality images 200ra thus generated are stored in a database which the machine learning system accesses in order to obtain the considered augmented reality images 200ra.

Returning back to [FIG. 1], during a step E120, the machine learning system obtains, for each augmented reality image, learning information comprising, for at least one given virtual element 210 of the considered augmented reality image 200ra:

a segmentation model 210ms of the given virtual element 210. For example, such a segmentation model is a binary mask of the object (or objects) and/or of the characteristic region (or characteristic regions) simulated by the given virtual element 210; and a set of contour points 210pt corresponding to a parametrization of the given virtual element 210. For example, the distribution of the points corresponds to a 2D or 3D parametrization of the object (or objects) and/or of the characteristic region (or characteristic regions) simulated by the given virtual element 210. For example, such a parametrization (also called parametric model) is a 3DMM model (standing for "3D Morphable Model"). For example, in the context of a 3D parametrization, the contour points of a 3D object may be referenced in 2D by the projection and the parametrization of the geodesic curve over the surface of the 3D object which represents the contour from the point of view of the camera that captured the real image.

Thus, the segmentation and distribution of the points over the contour 210pt are accurately carried out, the segmentation model 210ms and the set of contour points 210pt being obtained directly from the corresponding virtual element 210, and not by post-processing of the augmented reality image comprising the considered virtual element 210. For example, this allows solving the ambiguity inherent to the manual annotation of such points as well as easily going back to the parametrization from the contour points 210pt.

In some aspects, the learning information comprises a segmentation model 210ms and a parameterization of the contour points 210pt (instead of the coordinates of these contour points 210pt). This parametrization may be derived from the modeling of the virtual element 210, or else be an a posteriori specific modeling of the virtual element 210. For example, the machine learning system learns the control points of one or more spline(s), from which the contour points 210 are found afterwards. In this case, the output of the machine learning system consists of these modeling parameters (for example, control points), with an unchanged cost function (for example a Euclidean distance between the contour points and the ground truth). For this to be possible, the transformation allowing switching from the modeling parameters to the contour point 210pt should be differentiable, so that the gradients could be back-propagated by the learning algorithm of the machine learning system.

In some aspects, the learning information further comprises an additional term of consistency between the segmentation model 210ms and the contour points 210pt. This consistency is measured by the intersection between the segmentation model 210ms and the surface delimited by the contour points 210pt. For this purpose, a mesh is defined over this surface (for example by the well-known Delaunay algorithm of the prior art), which is used afterwards by a differential rendering engine which colors ("fills") this surface with a uniform value. Afterwards, it is possible to define a consistency term (for example a cross-entropy), which measures the proximity of the segmentation and the pixels of the rendered surface.

For example, the learning information are stored in the aforementioned database with reference to the corresponding augmented reality image 200ra.

Returning back to [FIG. 1], during a step E130, the machine learning system implements a learning phase based on the plurality of augmented reality images 200ra and learning information. Such a learning allows generating a set of parameters (or learning model) enabling the machine learning system to detect the considered object (or objects) and/or characteristic region (or characteristic regions) in at least one given image and to determine corresponding modeling information.

For example, during a given iteration of such a learning, the input of the learning system is the augmented reality image 200ra comprising the virtual element 210. The learning also implements the learning information associated with the augmented reality image 200ra. For example, the learning information are a segmentation model 210ms of the virtual object 210 and its contour points 210pt. The knowledge of the virtual element 210 for example through its parametric 3D model allows generating these learning information in a perfect manner, through the projection of the 3D model in the image for the segmentation model 210ms and by a sampling of the points of the model for the contour points 210pt. The output of the learning system is a segmentation model of the virtual element and its contour points, or a parametrization thereof. The learning is carried out by comparing the outputs of the learning system with the learning information, until convergence. In the case where the output of the learning system is a parametrization (for example 3DMM, a spline, Bezier curve, etc. . . . ), the contour points are determined from these parameters, and compared to the truth contour points.

In some aspects, for each augmented reality image 200*ra*, the learning of the machine learning system comprises a joint learning from the segmentation model 210*ms* and the set of contour points 210*pt*. Thus, a synergistic effect is obtained for the learning of the machine learning system, the learning of the segmentation model 210*ms* and the learning of the set of contour points 210*pt* reinforcing each other.

For example, the machine learning system comprises a branch for learning the segmentation model 210*ms* and a branch for learning the set of contour points 210*pt*. A cross-entropy is associated with the branch for learning the segmentation model and a Euclidean distance is associated with the branch for learning the set of contour points. The joint learning implements a cost function dependent on a linear combination between the cross-entropy associated with the segmentation model 210*ms* and a Euclidean distance associated with the set of contour points 210*pt*.

In some aspects, the machine learning system is a convolutional type semantic segmentation network. For example, the machine learning system is a "Unet" type network as described in the article by Ronneberger, Fischer, & Brox: "*U-Net: Convolutional Networks for Biomedical Image Segmentation*", 2015, or of the "Deeplabv3+" type as described in the article by Chen, Zhu, Papandreou, Schroff, & Adam: "*Encoder-Decoder with Atrous Separable Convolution for Semantic Image Segmentation*", 2018.

In the "U-Net" case, the structure of the network may be modified to jointly learn the segmentation model and the set of contour points. For example, the division into two branches (branch for learning the segmentation model and branch for learning the set of contour points) occurs at the last convolution layer of the decoder portion. Thus, the consistency between learning the segmentation model and learning the set of contour points is ensured. Moreover, pooling layers followed by a fully-connected layer allows reducing the dimensionality of the branch dedicated to learning the set of contour points.

In the "Deeplabv3+" case, a step of concatenating the low-level characteristics and the characteristics of the encoder is performed at a ×4 resolution. For example, it is at this level that splitting into two branches (one branch for learning the segmentation model and one branch for learning the set of contour points) is done. In some implementations, it is possible to add convolution layers, a pooling layer with maximum pooling (or "max pooling") and finally a fully-connected layer for learning the set of contour points.

According to the example illustrated in [FIG. 2*a*], [FIG. 2*b*], [FIG. 2*c*] and [FIG. 2*d*], the set of contour points 210*pt* of [FIG. 2*d*] comprises in particular the contour points 210*pt* which are concealed by the face 220 once the virtual pair of spectacles has been inserted into the real image 200 in order to generate the augmented reality image 200*ra*. Thus, the use of such virtual elements allows solving the problems of concealments, and therefore avoiding obtaining an incomplete annotation, as could be the case in the present example with the end of the spectacle temples concealed by the ears.

Thus, in aspects of the method PA100 in which the real image 200 comprises the illustration of a face, the learning information comprises, for at least one contour point 210*pt* of the set of points, information on visibility indicating whether the contour point 210*pt* is visible or if it is concealed by the face 220. Thus, the visibility of the contour points is taken into account.

For example, in the aforementioned aspects wherein the machine learning system is a semantic segmentation network of the convolutional type, for example of the "Unet" type or of the "Deeplabv3+" type, the cost function further depends on a binary cross-entropy associated with the visibility of the contour point 210*pt*.

In some aspects, the learning information comprises the parametrization of the given virtual element 210, and therefore indirectly of the object (or objects) and/or of the characteristic region (or characteristic regions) simulated by the given virtual element 210. Thus, the machine learning system is enabled to directly deliver the considered parametrization.

In some aspects, the method PA100 comprises a step of refining the learning in which the machine learning system refines the set of parameters delivered during the implementation of the step E310 from real data comprising annotated real images. Such an annotation is done either manually, or automatically (for example by implementing a face parsing algorithm).

Referring to [FIG. 3], the steps of a method for detecting and modeling one (or more) object(s) represented in at least one image and/or one (or more) characteristic region(s) of said at least one image are now described according to an aspect of the disclosure.

More particularly, the detection and modeling method according to the present technique is implemented by the aforementioned machine learning system trained by implementing the above-described learning method PA100 (according to any one of the aforementioned aspects).

Thus, during a step E310, the machine learning system performs a detection of one (or more) object(s) and/or one (or more) characteristic region(s) in at least one image (real or augmented image) and a determination of modeling information of the object (or of the objects) and/or of the characteristic region (or of the characteristic regions).

Thus, the learning having been done from augmented reality images 200*ra* comprising virtual elements 210 representative of the considered object (or objects) and/or characteristic region (or characteristic regions), the consistency of the modeling information with the modeling of the object (or objects) and/or of the characteristic region (or characteristic regions) is guaranteed.

Moreover, in aspects where both at least one object (for example a pair of spectacles) and at least one characteristic region of said at least one image (for example the eyes, the iris, the nose) are simultaneously detected and modeled, a synergy effect is obtained improving the performances obtained for the detection and modeling of said at least one object and of said at least one characteristic region compared to detection and modeling of only one of these two elements.

In some aspects, the modeling information comprises:
  a segmentation model of the object (or objects) and/or of the characteristic region (or characteristic regions); and
  a set of contour points corresponding to a parametrization of the object (or objects) and/or of the characteristic region (or characteristic regions).

Thus, it is easy to return back to the parametrization of the model from the contour points.

In some aspects described hereinabove with reference to [FIG. 1], the learning of the machine learning system comprises a joint learning from the segmentation model 210*ms* and the set of contour points 210*pt*. In some of these aspects, step E310 comprises a joint determination of the segmentation model of the object (or objects) and/or of the characteristic region (or characteristic regions) and of the set of contour points corresponding to a parametrization of the object (or objects) and/or of the characteristic region (or characteristic regions).

In some aspects described hereinabove with reference to [FIG. 1], the joint learning implements a cost function based on a linear combination between a cross-entropy associated with the segmentation model 210*ms* and a Euclidean distance associated with the set of contour points 210*pt*. In some of these aspects, the detection and modeling of step E310 implement the aforementioned cost function dependent on a linear combination between a cross-entropy associated with the segmentation model and a Euclidean distance associated with the set of points.

In some aspects described hereinabove with reference to [FIG. 1], the learning information comprises visibility information indicating whether a contour point 210*pt* is visible or whether it is concealed by the face 220. In some of these aspects, the detection and modeling of step E310 further determine, for at least one contour point, visibility information indicating whether the contour point is visible or whether it is concealed by a face of the image analyzed during step E310. Thus, the machine learning system furthermore determines the visibility of the contour points. Some of these aspects implement the cost function dependent on a loss of binary cross-entropy associated with the visibility of the contour points as implemented in the corresponding aspects described hereinabove with reference to [FIG. 1] for learning.

In some aspects described hereinabove with reference to [FIG. 1], the learning information comprises the parameterization of the virtual elements used in the augmented reality images, and therefore indirectly of the object (or objects) and/or of the characteristic region (or characteristic regions) simulated by the considered virtual elements. In some of these aspects, the detection and modeling of step E310 thus determine the parameterization of the object (or objects) and/or of the characteristic region (or characteristic regions) detected in the image analyzed during step E310.

In some aspects, the object (or objects) and/or the characteristic region (or characteristic regions) are represented in a plurality of images each representing a different view of the considered object (or objects) and/or considered characteristic region (or characteristic regions). In this manner, during step E310, the joint implementation of the detection and of the modeling in the different images of the plurality of images allows determining in an improved manner the modeling information of the considered object (or of the objects) and/or characteristic region (or characteristic regions).

In some aspects, the image to be analyzed by the machine learning system during step E310 is normalized in position. For example, when the image represents a face, for predetermined sub-portions of the face (for example the eye), a region around the considered sub-portion is resized, for example, using facial markers ("landmarks"). These markers may be obtained by any known marker detection or face recognition method. Thus, step E310 of detecting and determining modeling information is implemented for each resized region. In this manner, the detection of the object (or objects) and/or of the characteristic region (or characteristic regions) as well as the determination of the corresponding modeling information are facilitated.

In some aspects, markers (for example facial markers) are added over the image to be analyzed by the machine learning system during step E310 in order to indicate characteristic points (for example position of the nose, position of the temple point). For example, these markers may be obtained by a face analysis algorithm. In this manner, the detection of the object (or objects) and/or of the characteristic region (or characteristic regions) as well as the determination of corresponding modeling information are facilitated.

An example of implementation of the steps of the detection and modeling method is now discussed first with reference to [FIG. 4*a*] and [FIG. 4*b*]. According to this example, the image 400 comprises the illustration of a face 420. Moreover, it is assumed that the machine learning system has been trained to detect and model pairs of spectacles, for example from augmented reality images as described hereinabove with reference to [FIG. 2*a*], [FIG. 2*b*], [FIG. 2*c*] and [FIG. 2*d*]. Thus, the object 410 to be detected and modeled in the image 400 is a pair of spectacles. By implementing step E310, the machine learning system determines modeling information comprising the segmentation model 410*ms* and the set of contour points 410*pt* of the considered pair of spectacles. In particular, the set of contour points 410*pt* in [FIG. 4*b*] comprises the contour points 410*pt* which are concealed by the face 420 in the image 400. Thus, the method described herein allows solving the problems of concealments, and therefore avoiding obtaining an incomplete annotation, as could be the case in the present example with the end of the spectacle temples concealed by the ears.

Another example of implementation of the steps of the detection and modeling method is now discussed with reference to [FIG. 5]. More particularly, according to this example, the image 500 comprises the partial illustration of a face. The characteristic region 510*zc* to be detected and modeled is the eye represented in the image 500. Moreover, it is assumed that the machine learning system has been trained to detect and model eyes from augmented reality images comprising one or more virtual element(s) placed at the level of the eyes in order to model them. In this manner, by implementing step E310, the machine learning system determines modeling information for the characteristic region 510*zc* comprising in particular the set of contour points 510*pt* of the considered eye as well as the iris in this case.

Referring to [FIG. 6], an example of a device structure 600 allowing implementing some steps of the learning method PA100 of [FIG. 1] and/or of the detection and modeling method of [FIG. 3] is now described according to an aspect of the disclosure.

The device 600 comprises a random-access memory 603 (for example a RAM memory), a processing unit 602 equipped for example with one (or more) processor(s), and controlled by a computer program stored in a read-only memory 601 (for example a ROM memory or a hard disk). At the initialization, the code instructions of the computer program are for example loaded into the live memory 603 before being executed by the processor of the processing unit 602.

This [FIG. 6] illustrates only one particular manner, amongst several possible ones, for making the device 600 so that it performs some steps of the learning method PA100 of [FIG. 1] and/or of the detection and modeling method of [FIG. 3] (according to any one of the aspects and/or variants described hereinabove with reference to [FIG. 1] and [FIG. 3]). Indeed, these steps may be carried out indifferently on a reprogrammable computing machine (a PC computer, one (or more) DSP processor(s) or one (or more) microcontroller(s)) executing a program comprising a sequence of instructions, or on a dedicated computing machine (for example a set of logic gates such as one (or more) FPGA(s) or one (or more) ASIC(s), or any other hardware module).

In the case where the device 600 is made at least in part with a reprogrammable computing machine, the corresponding program (i.e. the sequence of instructions) could be stored in a removable storage medium (such as a CD-ROM, a DVD-ROM, a flash disk) or not, this storage medium being partially or totally readable by a computer or a processor.

In some aspects, the device 600 comprises the machine learning system.

In some aspects, the device 600 is the machine learning system.

What is claimed is:

1. A method for learning a machine learning system for detecting and modeling at least one object represented in at least one given image and/or at least one characteristic region of said at least one given image,
characterized in that said machine learning system performs:
generating a plurality of augmented reality images comprising a real image and at least one virtual element representative of said at least one object and/or of said at least one characteristic region;
obtaining, for each augmented reality image, learning information comprising, for at least one given virtual element of said augmented reality image:
a segmentation model of the given virtual element obtained from said given virtual element, and
either a set of contour points corresponding to a parametrization of the given virtual element, or said parametrization, obtained from said given virtual element; and
learning from the plurality of augmented reality images and said learning information, delivering a set of parameters enabling said machine learning system to detect said at least one object and/or said at least one characteristic region in said at least one given image and to determine corresponding modeling information comprising:
a segmentation model of said at least one object and/or of said at least one characteristic region, and
either a set of contour points corresponding to a parametrization of said at least one object and/or of said at least one characteristic region, or said parametrization.

2. The learning method according to claim 1 wherein, for each augmented reality image, said learning of said machine learning system comprises joint learning from, on the one hand, said segmentation model of the given virtual element and, on the other hand, said set of contour points corresponding to a parameterization of the given virtual element.

3. The learning method according to claim 2, wherein said joint learning implements a cost function dependent on a linear combination between, on the one hand, a cross-entropy associated with said segmentation model of the given virtual element and, on the other hand, a Euclidean distance associated with said set of contour points corresponding to a parametrization of the given virtual element.

4. The learning method according to claim 1, wherein said real image comprises the illustration of a face,
and wherein said learning information comprises, for at least one contour point of said set of contour points corresponding to a parametrization of the given virtual element, visibility information indicating whether the contour point is visible or whether it is concealed by said face.

5. The learning method according to claim 2:
wherein said real image comprises the illustration of a face, and said learning information comprises, for at least one contour point of said set of contour points corresponding to a parametrization of the given virtual element, visibility information indicating whether the contour point is visible or whether it is concealed by said face; and
wherein said cost function further depends on a binary cross-entropy associated with the visibility of said contour point.

6. A method for detecting and modeling at least one object represented in at least one image and/or at least one characteristic region of said at least one image,
characterized in that a machine learning system, trained by implementing the learning method according to claim 1, performs a detection of said at least one object and/or of said at least one characteristic region in said at least one image and performs a determination of the modeling information of said at least one object and/or of said at least one characteristic region.

7. The detection and modeling method according to claim 6, wherein:
for each augmented reality image, said learning of said machine learning system comprises joint learning from, on the one hand, said segmentation model of the given virtual element and, on the other hand, said set of contour points corresponding to a parameterization of the given virtual element; and
said determination comprises a joint determination:
of said segmentation model of said at least one object and/or of said at least one characteristic region; and
of said set of contour points corresponding to said parametrization of said at least one object and/or of said at least one characteristic region.

8. The detection and modeling method according to claim 6, wherein:
said real image comprises the illustration of a face, and said learing information comprises, for a least one contour point of said set of contour points corresponding to a parametrization of the given virtual element, visibility information indicating whether the contour point is visible or whether it is concealed by said face; and
said at least one image comprises the representation of a given face, and wherein said machine learning system further determines, for at least one given contour point of said set of contour points corresponding to said parametrization of said at least one object and/or of said at least one characteristic region, visibility information indicating whether the given contour point is visible or whether it is concealed by said given face.

9. The detection and modeling method according to claim 6, wherein said at least one image comprises a plurality of images each representing a different view of said at least one object and/or of said at least one characteristic region, and wherein said detection and said determination are implemented jointly for each of said plurality of images.

10. Computer program product comprising a non-transitory computer-readable medium storing program code instructions for implementing the method according to claim 1, when said program is executed on a computer.

11. A device for detecting and modeling at least one object represented in at least one image and/or at least one characteristic region of said at least one image,
characterized in that it comprises at least one processor and/or at least one dedicated computing machine configured to implement:

generating a plurality of augmented reality images comprising a real image and at least one virtual element representative of said at least one object and/or of said at least one characteristic region;

obtaining, for each augmented reality image, learning information comprising, for at least one given virtual element of said augmented reality image:
- a segmentation model of the given virtual element obtained from said given virtual element, and
- either a set of contour points corresponding to a parametrization of the given virtual element, or said parametrization, obtained from said given virtual element; and learning from the plurality of augmented reality images and said learning information, delivering a set of parameters enabling said machine learning system to detect said at least one object and/or said at least one characteristic region in at least one given image and to determine corresponding modeling information comprising:
- a segmentation model of said at least one object and/or of said at least one characteristic region, and
- either a set of contour points corresponding to a parametrization of said at least one object and/or of said at least one characteristic region, or said parametrization.

\* \* \* \* \*